Dec. 1, 1959   W. J. TULL ET AL   2,915,748
MICROWAVE DRIFT SIGHT AND SPEED INDICATOR
Filed June 1, 1956   4 Sheets-Sheet 1

Fig-4
A  25~ POTENTIAL
B  D-C POTENTIAL
C  D-C POTENTIAL

WILLIAM J. TULL
ARDEN H. FREDRICK
MICHAEL W. McKAY
WILLIAM B. LURIE
INVENTORS.

BY
ATTORNEY

Dec. 1, 1959 W. J. TULL ET AL 2,915,748
MICROWAVE DRIFT SIGHT AND SPEED INDICATOR
Filed June 1, 1956 4 Sheets-Sheet 3

WILLIAM J. TULL
ARDEN H. FREDRICK
MICHAEL W. McKAY
WILLIAM B. LURIE
    INVENTORS.

BY  H. A. Mackey
        ATTORNEY

Dec. 1, 1959   W. J. TULL ET AL   2,915,748
MICROWAVE DRIFT SIGHT AND SPEED INDICATOR
Filed June 1, 1956   4 Sheets-Sheet 4

WILLIAM J. TULL
ARDEN H. FREDRICK
MICHAEL W. McKAY
WILLIAM B. LURIE
INVENTORS

BY  H. A. Mackey
ATTORNEY

United States Patent Office 2,915,748
Patented Dec. 1, 1959

2,915,748

MICROWAVE DRIFT SIGHT AND SPEED INDICATOR

William J. Tull, Pleasantville, Arden H. Fredrick, Mount Kisco, Michael W. McKay, Tarrytown, and William B. Lurie, New Rochelle, N.Y., assignors to General Precision Laboratory Incorporated, a corporation of New York Application June 1, 1956, Serial No. 588,908

16 Claims. (Cl. 343—9)

This invention relates to aircraft drift sights and speed indicators employing microwave radio beams and particularly to arrangements wherein speed and drift information is obtained from a Doppler signal derived from the difference in frequency between that of transmitted signals and the reflected echo signals thereof.

The present invention provides a drift sight which weighs no more than the usual optical telescope sight, and which is not less accurate. The present invention can be used at night, through overcast and at nearly any altitude. It eliminates most errors due to aircraft motions and provides its drift angle output as a remote dial indication. The sight additionally provides ground speed indication. The microwave drift sight is distinguished from other microwave echo instruments by lightness and compactness achieved by simplified component design which does not significantly sacrifice accuracy. A further important difference is the use of a manual procedure for finding and acquiring the Doppler signal and for applying the automatic signal tracker thereto.

The microwave drift sight comprises a transmitter-receiver-antenna unit which develops Doppler difference signals containing speed and drift information. This information is contained in the signal frequencies, which are in or near the audio range. These frequencies are applied to a frequency tracker which automatically tracks them and converts them to speed and drift angle dial readings. Provision is made for "memory" operation if the input signal should drop below threshold value. The drift sight thereupon continues to indicate the last-received speed and drift values and, upon resumption of the input signal at approximately these same values, the frequency tracker again locks to its input signal and resumes automatic tracking of the Doppler frequency thereof. Provision is made for manual acquisition of the input signal by the frequency tracker at the start of operation, and also upon resumption after memory operation if either the aircraft speed or drift angle has changed markedly. This use of manual rather than automatic acquisition greatly reduces complexity of design and results in a compact and light drift sight.

A microwave drift sight may employ any type of microwave antenna emitting one or more beams producing Doppler frequency difference drift angle information. However, it has been found that a four-beam planar antenna, horizontally stabilized in pitch but unstabilized in roll, provides a signal containing accurate information and easily processed, so that the use of this more complex antenna results in overall improvement of both accuracy and weight. Specifically, the four-beam antenna employed produces a signal having a Doppler frequency which is not affected by reasonable variations in the microwave transmitting frequency, and which is relatively not affected by pitching or rolling motions of the antenna array. Additionally, such an array, servoed to the aircraft ground track direction, contains aircraft ground speed information in its received signal, so that speed indication can be secured in addition to drift indication.

The use of low power in the transmitter permits and indicates the employment of a duplexer other than the discharge tube type, leading to faster recovery of the receiver after the transmitting pulse, and permitting weight and space reduction.

The frequency tracker contains a single set of components which, by time sharing, performs the function of two sets of components arranged in two channels, thus further reducing weight without impairing accuracy. A simple azimuth servomechanism, controlled by a frequency tracker output signal positions the antenna array to the ground track and indicates the drift angle. A second servomechanism controlled by another frequency tracker output signal indicates the aircraft ground speed.

A signal-to-noise ratio detector is provided which, when the ratio falls below a selected level, disconnects both the speed and drift output dials from the frequency tracker, so that they continue to read their last-received data, or "remember" the data. This is termed "memory" operation. Upon increase of the signal-to-noise ratio to a value above the selected level, if the speed and drift data are substantially unchanged from the remembered values, the frequency tracker again locks to its input signal and tracks automatically thereafter.

In order to achieve maximum simplicity of design with resulting lightness and compactness of equipment, manual acquisition of signal is effected in two steps. The first step is to lock the frequency tracker to its input signal so that it may thereafter track the Doppler frequency information contained in the received microwave beams. The first step is begun by changing the frequency of the frequency tracker until, in effect, it coincides with the Doppler frequency, whereupon locking occurs and a first acquisition signal lamp or other indicator is displayed. The second step consists of swinging the antenna array until its four beams straddle the ground track, when azimuth locking occurs and a second acquisition signal lamp is displayed.

The principal purpose of this invention is to provide an aircraft drift sight employing microwave radiation.

Another purpose of this invention is to provide an aircraft drift sight having improved lightness and compactness combined with remote reading dials.

Still another purpose of this invention is to provide an aircraft dright sight which indicates not only the drift angle but also the ground speed of the aircraft.

A further understanding of this invention may be secured from the detailed description and associated drawings, in which.

Antenna-receiver-transmitter

Figure 1:
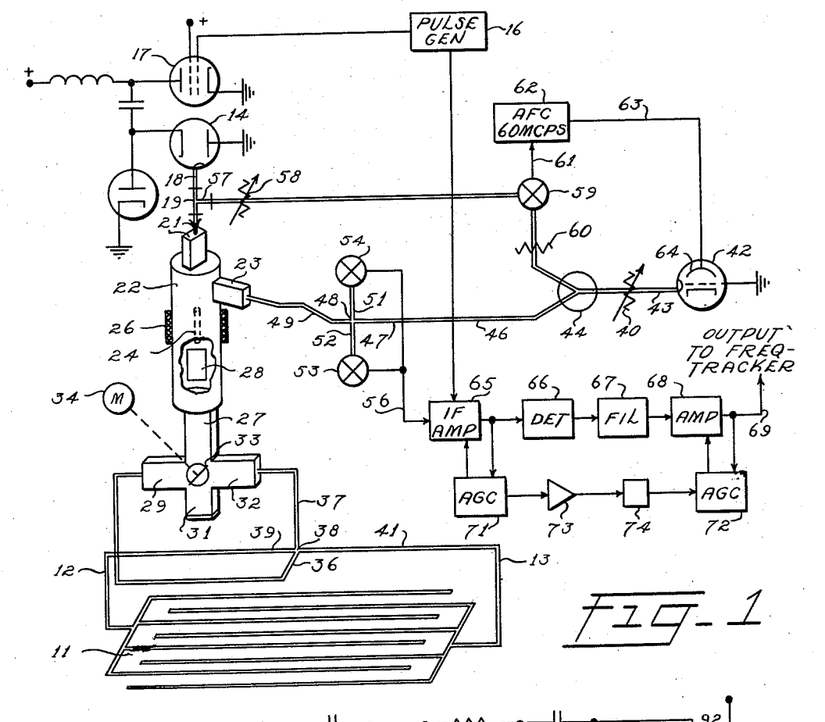
Figure 1 is a schematic circuit diagram of the microwave and intermediate frequency portions of the drift sight of the invention, including oblique illustrations of the antenna switch and duplexer

Referring now to Fig. 1, a planar microwave antenna 11 consists of a plurality of linear antenna arrays arranged side by side to form a horizontal sheet of arrays, eight such linear arrays being indicated in Fig. 1. Each linear array contains a single row of microwave space radiators in its bottom surface. Successive arrays are fed from opposite ends by microwave rectangular hollow waveguides 12 and 13, and the distal end of each array is terminated by a microwave-absorbing plate so that the small amount of residual microwave energy which remains after feeding all radiators is absorbed and is not reflected back toward the feed end of the array.

The planar array 11 is fed through its input guides 12 and 13 by microwave energies which are alternately in phase and of opposite phase, the alternations being at the rate of one cycle per second. When the energies in guides 12 and 13 are in phase two beams are emitted, one being forward and to the right and the other rearward and to the left, relative to the array centerline. When the energies are of opposite phase two other beams are emitted, one forward and left and the other rearward and right.

The construction of this planar array is fully described in patent application Serial No. 334,914, filed February 3, 1953, for Planar Microwave Antenna Array and patent application Serial No. 562,448, filed January 31, 1956, for Microwave Antenna Array. Such linear arrays consist of two kinds of space radiators in alternation which radiate with $$\frac{\pi}{2}$$

relative coupling phase with respect to the exciting voltage in the guide. These radiators are equally spaced and the spacings and the coupling phases are such that, considering the radiators as separated into groups of two radiators each, both radiators in a group radiate in phase but the radiations of succesive groups differ in phase by $\pi$. Adjacent linear arrays are longitudinally displaced so that the transverse phase sequence is also zero and $\pi$. This distribution results in the simultaneous emission from the horizontal planar array of two beams of microwave radiation of such cross sectional form that the trace of the intersection of each with the earth is an hyperbola, resulting in energy from all parts of a trace uniformly producing substantially the same Doppler frequency, considering only the geometry. At the same time the angular directions of the two beams relative to the center line of the array depend on the relative phase excitations of adjacent linear arrays.

The Doppler frequencies are produced by the "Janus" method, in which the forward-right beam return is mixed with the rearward-left beam return to secure, by subtraction of frequencies, the Doppler frequency difference. Similarly, mixing of the forward-left and rearward-right returns produces a second Doppler frequency difference. When these Doppler frequency differences are equal the projections of the four beams are at equal azimuth angles with the aircraft ground track, and the numerical value of the Doppler difference frequency is then representative of the aircraft ground track speed.

Pulsed microwave energy is generated by a magnetron 14 which is conventionally pulsed by a pulse generator 16 through a hard tube pulser 17. As an example of specific values, the magnetron microwave frequency may be 9000 mc. p.s. and the pulsing frequency 80 kc. p.s., with a pulse length of 3.13 $\mu$'s or 25% of the pulse period.

The magnetron microwave output is transmitted through waveguide 18, the collinear arms of a shunt T 19 and waveguide 21 to a ferrite duplexer 22. This duplexer is generally described in Patent No. 2,644,930, issued July 7, 1953, except that a novel phase purifier has been added. Briefly, this duplexer as improved comprises a round waveguide into one end of which generator energy is introduced from rectangular waveguide 21, the junction being appropriately impedance matched. The $TE_{11}$ polarized mode is thereby set up in the round waveguide. A shunt sidearm 23 is oriented at 90° to the input arm so that it is unaffected by the input energy. A ferrite rod 24 is positioned axially in the round waveguide and is magnetized by a surrounding solenoid 26. Parameters are so selected that the input polarization is rotated clockwise by 45°, and the output taken by rectangular waveguide 27 is so oriented and matched as to offer no mismatch to the energy so polarized. Echo energy entering from arm 27 is rotated counterclockwise relative to its direction of passage, so that its exit is through side arm 23 to a receiver circuit.

In the ferrite duplexer circuit as so far described misoperation may occur. For example, leakage of generator microwave energy from magnetron arm 21 to receiver arm 23 is reflected to some extent by impedance mismatches in the latter arm. Indirect leakage into arm 23 also occurs due to reflection of transmitter power from antenna or waveguide impedance discontinuities. This leakage energy reflected from arm 23 passes through the duplexer and is rotated clockwise 45° by the ferrite rotator 24. The polarization of the energy is then at 90° to the proper orientation to permit energy to pass out of the output waveguide 27 and consequently all of this energy is reflected from the output junction. The energy is again rotated by rotator 24, polarizing it to enter transmitting arm 21, where it affects or "pulls" the magnetron frequency. To eliminate such improper operation a microwave energy absorbing card 28 is placed in the duplexer at right angles to the direction of the normal electric field, thus absorbing the abnormal reflected energy which is at 90° to the normal direction. Alternatively to the absorbing card, a side arm filled with absorbing card, a side arm filled with absorbing material may be applied at that point to absorb the energy at the unwanted orientation.

The rectangular waveguide 27 leading from duplexer 22 constitutes the input arm of a waveguide microwave switch. This switch is fully described in Patent No. 2,690,539 issued September 28, 1954 entitled Microwave Switch, and consequently need be only briefly described herein. This switch is composed of four cruciform arms 27, 29, 31 and 32, with a rotor 33 at their junction. The rotor comprises a dipole resonant to the microwave energy employed and therefore reflects input energy applied through arm 27 to arm 29 when positioned diagonally as illustrated, or reflects energy to arm 32 when positioned at 90° to the illustrated position. A motor or solenoid 34 positions the rotor 33. Arm 31 is short circuited and has such length as to match out any impedance discontinuity during switching and caused thereby.

The rectangular waveguide output arms 29 and 32 are connected to the shunt and series arms 36 and 37 of a rectangular waveguide hybrid junction 38 of the magic tee type. The collinear arms 39 and 41 of this junction are connected to the feed waveguides 12 and 13 of antenna array 11. In the operation of switch 33 and hybrid junction 38, when the rotor 33 is in the position illustrated all of the energy is transmitted to hybrid junction shunt arm 36 and is equally divided between output arms 39 and 41, where the energies are in phase. The energies thus applied through feed arms 12 and 13 to antenna 11 being in phase, the antenna emits two microwave beams to the forward-right and to the rearward-left. When the switch rotor 33 is positioned at 90° to that illustrated, all of the microwave energy is directed out arm 32 to the series arm 37 of the hybrid junction, and the energy is again equally divided but this time is opposite in phase in the two arms 39 and 41 and in the antenna input feeders 12 and 13. The antenna then changes the directions of its two beams to left-forward and right-rear.

A local oscillator 42, which may be a reflex klystron, is accurately frequency controlled at a frequency which is below that of the magnetron generator 14 by the amount of the intermediate frequency (IF) which may be selected as 60 mc. p.s. As example, then, the output frequency of local oscillator 42 is 8040 mc. p.s. This output is applied through attenuator 40, waveguide 43, power divider 44 and waveguide 46 to the shunt arm 47 of a magic tee 48. The series arm 49 of this magic tee is connected to the receiver arm 23 of duplexer 22, and the collinear arms 51 and 52 are connected to two crystal mixers 53 and 54, inversely phased. This combination of magic tee and modulators comprises a balanced microwave mixer and modulator, the IF difference of the applied microwave energy frequencies appearing on output conductor 56.

The waveguide T 19 contains an iris opening so that only a small part of the magnetron energy is drawn off by the side arm 57. This energy is applied through attenuator 58 to a mixer-modulator 59 to which is also applied a part of the local oscillator output through power divider 44 and fixed attenuator 60, the IF difference appearing on output conductor 61. This IF energy is employed to control the frequency of the local oscillator.

An automatic frequency control (AFC) circuit 62 contains an IF amplifier, discriminator and phantastron circuit, the signal being applied through conductor 61. The phantastron circuit is fully described in vol. 1 of the Radiation Laboratory series entitled Radar System Engineering by L. N. Ridenour, on page 500, and the entire radar automatic frequency control circuit is discussed on pages 436, 437 and 632 of the same volume. In the operation of the AFC circuit, Fig. 1, if the signal be weak or absent, the input from the discriminator to the phantastron is less negative than −1½ volt, and the phantastron emits a sawtooth voltage varying over a short time period between −90 and −160 v. This voltage is applied through conductor 63 to the reflector 64 of local oscillator 42, varying its output frequency through a wide range. When its output frequency becomes 60 mc. p.s. below that of magnetron 14, the 60 mc. p.s. IF signal is amplified and demodulated in the AFC circuit 62 to increase the potential applied to the phantastron to more negative than −1½ volts. The phantastron thereupon stops sweeping and applies its input voltage, amplified, to reflector 64 to maintain constant local oscillator output frequency.

The IF output of the balanced mixer on conductor 56 is applied to an intermediate frequency amplifier 65. The output of the intermediate frequency amplifier is demodulated in detector 66 and the resulting Doppler frequencies are applied to a filter 67 passing a band between zero frequency and 24 kc. p.s., the Doppler frequency band, and highly attenuating the IF and all frequencies above 31 kc. p.s. The output of the filter is applied to a Doppler frequency amplifier 68, and from it to a frequency tracker through conductor 69.

The IF and Doppler frequency amplifiers are highly gain-controlled by circuits 71 and 72, the latter of which employs its output signal to control a resistance tube which applies inverse feedback to one stage of its amplifier. Additionally, it is desirable when very strong Doppler signals are received to reduce the gain more than it is normally reduced by the AGC to prevent the second harmonic of the Doppler signal from causing false operation. This is effected by amplifying the inverse gain-controlling signal of circuit 71 in amplifier 73, then limiting it by a clamping circuit 74, so that it is effective only when the input signal is above a selected high level, then applying it to augment the attenuation of circuit 72.

*Frequency tracker*

The Doppler-frequency signal does not have a single frequency, but contains a wide continuous range of frequencies resembling "noise." This spectrum of frequencies typically has a width between 6 db points of 15% of its center frequency. Its center frequency in the application here contemplated will be between 1, 3 and 24 kc. p.s.

Figure 2:
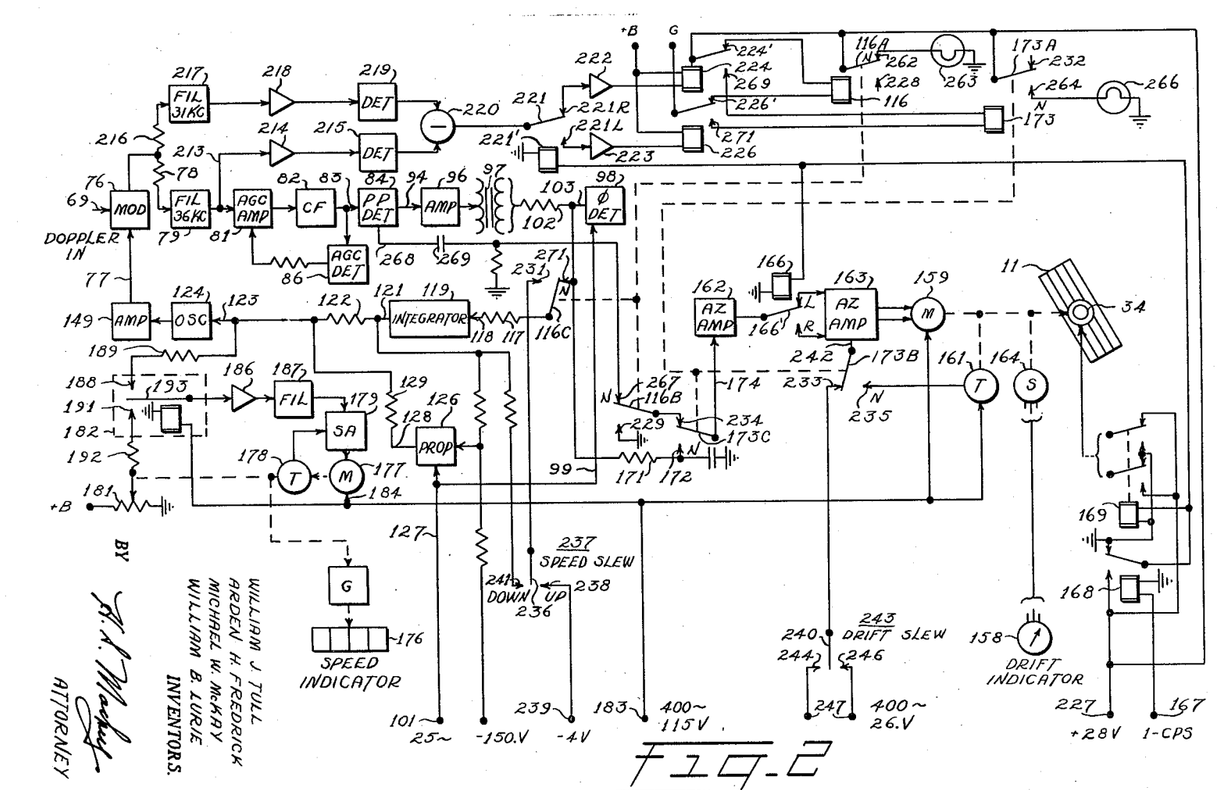
Figure 2 is a block circuit diagram of the remainder of the drift sight including the circuit interconnections of the several electromagnetic relays.

This Doppler signal is applied through conductor 69, Figs. 1 and 2, to a balanced modulator 76, Fig. 2. This is the first component of a frequency tracker the function of which is to find the statistical center frequency of the Doppler frequency spectrum, to lock to that frequency, to track it as it changes, and to emit an electrical signal which is at all times representative of that frequency.

When the frequency tracker is locked to its input signal which has a center frequency, for example, of 13,000 c.p.s., a heterodyning frequency is applied to the modulator 76 through conductor 77 of such frequency above the Doppler frequency as to produce a difference frequency of 36 kc. p.s. The heterodyning energy will also generally contain a frequency modulation of 25 cycles per second of ±5% of the Doppler frequency produced in a manner more fully described hereinafter. This difference frequency energy is applied through isolating resistor 78 to a band pass filter 79 centered at 36 kc. p.s. and having a pass band of 200 c.p.s. This filter eliminates the heterodyne sum frequency and the two modulator input frequencies, if present, and also all harmonic combinations, passing only the difference frequency 200 cycle spectrum centered at 36 kc. p.s. This output is amplified in delayed automatic gain control (AGC) amplifier 81 and in a cathode follower 82 before application through conductor 83 to a push-pull detector or amplitude demodulator 84. The cathode follower 82 output is also applied to an automatic gain control detector 86 which so controls the AGC amplifier 81 as to eliminate most long-period amplitude modulation, while permitting the amplitude modulation at the 25 c.p.s. rate to pass.

Figure 3:
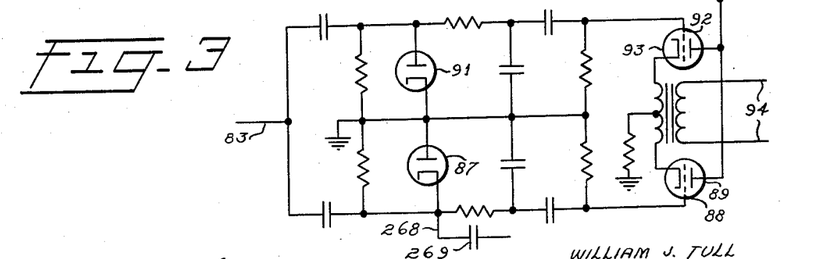
Figure 3 is a schematic circuit diagram of the push-pull detector used in the invention.
Figure 4:
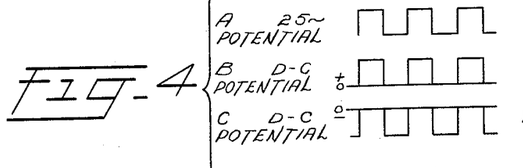
Figures 4, 7, 8, 9 and 10 are idealized graphs illustrating operation of the apparatus of the invention.

The circuit of push-pull detector 84 is depicted in Fig. 3, in which the input signal on conductor 83 is rectified by diode 87 to produce an intermittent positive potential. This potential is applied to grid 88 of the triode 89. Similarly diode 91 rectifies the input signal to produce an intermittent negative potential which is then applied to grid 92 of the triode 93. The demodulated push-pull 25 c.p.s. envelope is developed on output conductors 94. This 25 c.p.s. output is amplified in an amplifier 96, Fig. 2, and the output voltage is stepped up in a transformer 97. A phase detector 98 receives a 25 c.p.s. phasing input through conductor 99 from a 25 c.p.s. power source represented by terminal 101, and converts the transformer signal A. Fig. 4, received through resistor 102, Fig. 2, and conductor 103 to intermittent direct current which is either positive or negative, depending on the phase, as depicted in Fig. 4, B and C respectively.

Figure 5:
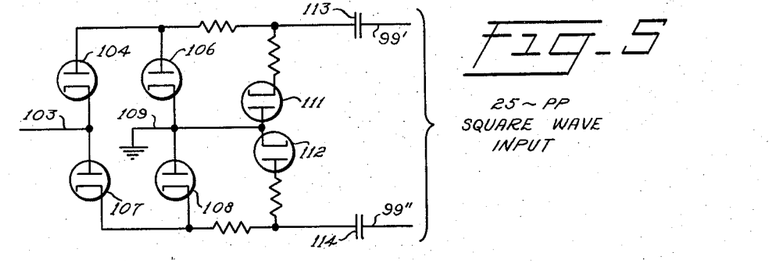
Figure 5 is a schematic circuit diagram of the 25 c.p.s. phase detector.

In the operation of this phase detector, Fig. 5, 25 c.p.s. square wave power is applied through conductors 99′ and 99″ to diodes 104, 106, 107 and 108. When conductor 99′ is positive all four diodes conduct and signal input conductor 103 is grounded at ground connection 109. If the 25 c.p.s. signal on conductor 103 has the same phase as conductor 99′ it will attain ground potential during its positive half cycle and will attain negative peak-to-peak potential during negative half cycles as depicted in Fig. 4C. If the 25 c.p.s. signal on conductor 103 has the opposite phase it will be converted to intermittent positive direct current as depicted in Fig. 4B. When the conductor 99′ is negative, diodes 111 and 112 conduct, normalizing capacitors 113 and 114 by grounding them.

The intermittent direct potential, either positive or negative, or conductor 103 is applied through a relay contact arm 116C, Fig. 2, resistor 117 and conductor 118 to an integrating amplifier 119. This amplifier is fully described in patent application Serial No. 314,306 filed October 11, 1952 for Automatic Signal Frequency Tracker, now U.S. Patent No. 2,856,519. In this integrating amplifier direct potentials applied through conductor 118 to a direct-coupled discharge tube amplifier are amplified, and by virtue of Miller feedback circuits in the amplifier are also integrated with a time constant of the order of several hundred seconds. The output at conductor 121 is a direct potential within the range of +60 to +120 volts this potential continually increasing within its range when the input potential at conductor 118 continues to be negative and continually decreasing when the input continues to be positive. When the input potential is zero the output potential is constant.

The integrator output potential on conductor 121 is applied through resistor 122 and conductor 123 to an oscillator 124. This oscillator is a free running multivibrator so proportioned that its output frequency is a linear function of the grid bias, the latter being secured through conductor 123. The oscillator frequency range is 36 kc. p.s. to 60 kc. p.s.

The output of oscillator 124 is frequency modulated by a proportioning circuit 126 which is supplied through conductor 127 with 25 c.p.s. power from terminal 101. The proportioning circuit is also supplied with direct potential from the integrator output conductor 121, and emits a 25 c.p.s. signal at conductor 128 having a peak-to-peak value proportional to the integrator output. This 25 c.p.s. signal is added in an adding circuit consisting of resistors 129 and 122 to the integrator output, and the resulting amplitude-modulated direct potential at conductor 123 is applied to oscillator 124.

Figure 6:
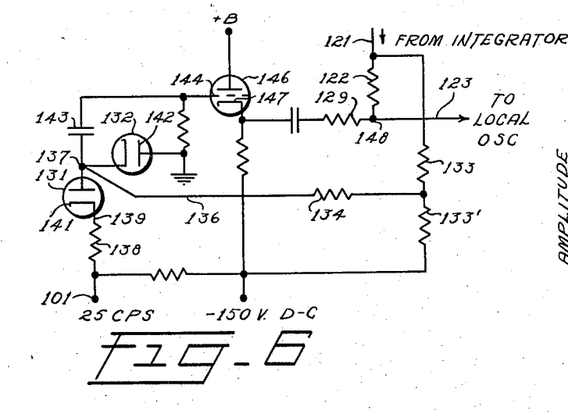
Figure 6 is a schematic circuit diagram of the proportioning circuit.

The proportioning circuit comprises two diodes 131 and 132, Fig. 6, connected in series, with the integrator output potential applied from conductor 121 through resistors 133 and 134 and conductor 136 to the common junction 137. 25 c.p.s. power from terminal 101 is applied through resistor 138 and conductor 139 to the cathode 141 of diode 131. Anode 142 of diode 132 is grounded. The junction 137 is connected through a capacitor 143 to grid 144 of a triode cathode follower 146. Output is taken from cathode 147 and is added in resistors 129 and 122 to the integrator output. Common junction 148 constitutes the output terminal and is connected through conductor 123 to the oscillator 124, Fig. 2.

In operation of the proportioning circuit, when the 25 c.p.s. power applied to cathode 141, Fig. 6, is negative, both diodes conduct and junction 137 is placed at ground potential. When cathode 141 is positive, neither diode conducts and the potential of junction 137 is that of the integrator output suitably reduced by the voltage divider comprising resistors 133 and 133'. Thus an alternating potential having peak-to-peak value representing that of conductor 121 is applied to grid 144 and a potential nearly as large is applied to resistor 129. The output on conductor 123 therefore represents the integrator output direct potential plus the controlled 25 c.p.s. potential.

The output of oscillator 124, Fig. 2, which as heretofore stated has a frequency which is a linear function of the potential applied thereto, is converted to a push-pull output by a phase-splitting amplifier 149 having equal anode and cathode potential swings, and the output thereof is applied through conductor 77 to the balanced modulator 76.

Figure 7:
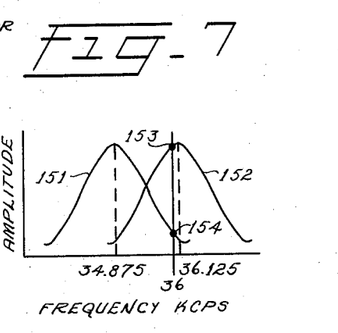
Figure 8:
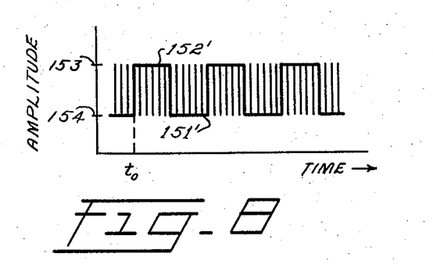
Figure 9:
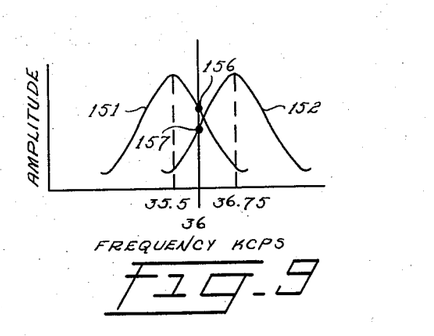
Figure 10:
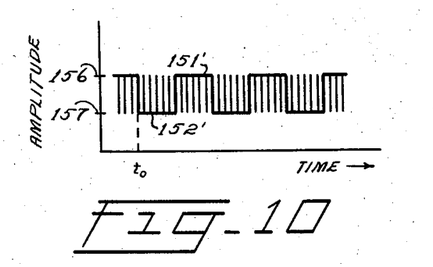

The described components connected in a loop form what is termed the main loop of the frequency tracker. To illustrate its operation let it be assumed that energy having a Doppler frequency of 13 kc. p.s. is applied to conductor 69, and that the instantaneous output of the oscillator 124 has a median frequency of 12.5 kc. p.s. plus 36 kc. p.s., or 48.5 kc. p.s. This output is frequency modulated at 25 c.p.s. with a frequency swing of ±5% of 12.5 kc. p.s., so that the actual output of the oscillator consists of a signal having two alternate frequencies, 47.875 kc. p.s. and 49.125 kc. p.s. The difference frequencies of these frequencies and 13 kc. p.s. are 34.875 kc. p.s. and 36.125 kc. p.s. These difference frequency bands having the form of the Doppler spectrum are illustrated at 151 and 152, Fig. 7. The 36 kc. p.s. filter frequency, not being centered between the spectra, cuts through at points 153 and 154, representing different amplitude transmissions through the filter. The output of the filter 79 is therefore indicated in Fig. 8, the negative half cycles 151', $\frac{1}{50}$ second wide, representing the spectrum 151 having a 34.875 kc. p.s. center frequency and the positive half cycles 152' representing the spectrum 152 having a 36.125 kc. p.s. center frequency. The filter output of course alternates at 25 c.p.s. If the difference frequencies should be changed to 35.35 and 36.65 kc. p.s., they would be equidistant from the 36 kc. p.s. filter frequency, points 153 and 154 would coincide, and the amplitude of the graph of Fig. 8 would become zero. If the difference frequencies were 35.5 and 36.75 kc. p.s. as in Fig. 9, the intersecting points 156 and 157 would represent the 35.5 and 36.75 kc. p.s. frequencies respectively and if plotted to a time base would appear as in Fig. 10. This graph has the opposite phase to that of Fig. 8. Thus the detector output on conductor 94, Fig. 2 consists of a 25 c.p.s. error signal having amplitude representing the adjustment error of the oscillator and having phase sense representing error sense.

The output potential of detector 84 is amplified at 25 c.p.s. in amplifier 96 and transformer 97 and is converted to an intermittent direct current signal by phase detector 98. If this signal be negative, and it is so assumed, the integrator output direct potential increases and causes the output frequencies of oscillator 124 to increase. This reduces the error signal until, when the median oscillator output frequency has become 49 kc. p.s., the difference frequency becomes exactly 36 kc. p.s., the error signal vanishes, the integrator input becomes zero, and the output becomes constant. If now the input Doppler frequency should change, the above process would be repeated at such speed that the error signal would remain very small. This process of operation is what is meant when the tracker is described as locked to the Doppler signal and following or tracking it as it changes.

*Drift indicator and azimuth servo*

The drift indicator comprises a remote indicating meter 158 indicating the angle between the antenna array centerline and the aircraft centerline when the former is servoed to the ground track. The antenna array 11, Figs. 1 and 2, is servoed by a conventional position servo-mechanism comprising motor 159, tachometer 161 and azimuth amplifiers 162 and 163. A synchro transmitter 164 operated from the azimuth axis of the antenna provides remote indication at synchro receiver and indicator 158 of the antenna position. A relay 166 operated at one c.p.s. in synchronism with the alternations of the microwave right and left beams phases the servo amplifier input connections and controls the direction in which motor 159 rotates. Relay 166, Fig. 2, and switch motor 34, Figs. 1 and 2, are operated from a one c.p.s. source represented by terminal 167, Fig. 2, through relays 168 and 169, relay 166 constituting a phase detector. Input to azimuth servo amplifier 162 is taken from conductor 103 through isolating resistor 171, relay contact 172, relay contact arm 173C and conductor 174. In normal operation relay arm 173C rests on contact 172.

Figure 13:
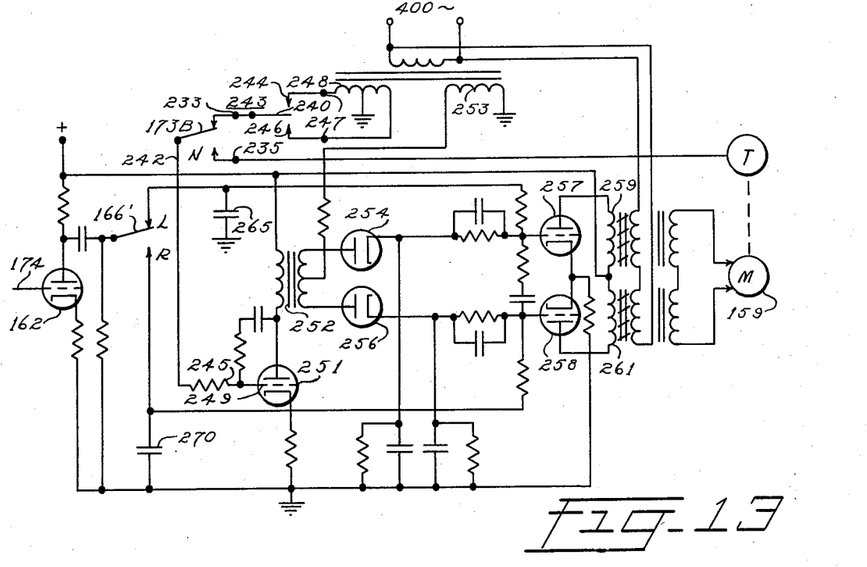
Figure 13 is a schematic diagram of a portion of the azimuth servomechanism.

So far it has been implied that the antenna beams are positioned at exactly equal angles on either side of the ground track. The Doppler echo signals received in the two beams directions will then be equal, so that any signal at conductor 103 will be equal in both right and left beam switch positions, and the error output from phase detector 98 will approach zero. This signal, applied to amplifier 162, Figs. 2 and 13, is then applied through switch arm 166' is integrated by capacitors 265 and 270 and is applied to the control grids of tubes 257 and 258. These grids are brought to the same potential when the error signal vanishes, so that motor 159 remains stationary. However, if the array be not centered on the ground track the two Doppler returns will be different in frequency, so that the error signals in the right and left beam switch positions will have different amplitudes. There will be then an error signal which will charge one of the capacitors positively and the other negatively, rotating motor 159 in such direction as to rotate the array toward the ground track. The array is thus kept centered on the ground track to a high degree of accuracy.

Speed indicator and servo

The speed indicator comprises a direct-reading dial or counter 176 operated by a position servomechanism including motor 177, tachometer 178 and servo amplifier 179. The instrumentation also includes a potentiometer 181 and a vibrator or chopper 182. The latter is operated from any convenient alternating source such as the 400 c.p.s. power supply represented by terminal 183. This same source also powers one phase connection 184 of the two-phase motor 177. The chopper output passes through amplifier 186 and 400 c.p.s. filter 187 before application to servo amplifier 179. One contact 188 of chopper 182 is supplied from conductor 123 through resistor 189 with the same modulated direct potential that is employed to control the bias of oscillator 124. This potential is a linear measure of the Doppler frequency and hence of the aircraft ground speed. The other chopper contact 191 is supplied through resistor 192 with direct positive potential from potentiometer 181.

In the operation of the speed indicator circuit, when the potentials on contacts 188 and 191 are unequal an alternating potential appears on contact arm 193 having a magnitude representing the inequality and a phase dependent upon which contact has the higher potential. This alternating potential is amplified and applied to drive motor 177, phased by its connection 184, in such direction as, through potentiometer 181, to bring the potential of contact 191 into equality with the potential of contact 188. When this has been accomplished the error signal disappears and the motor stops. Dial 176 then correctly indicates aircraft speed in knots.

Pitch stabilization

Figure 11:
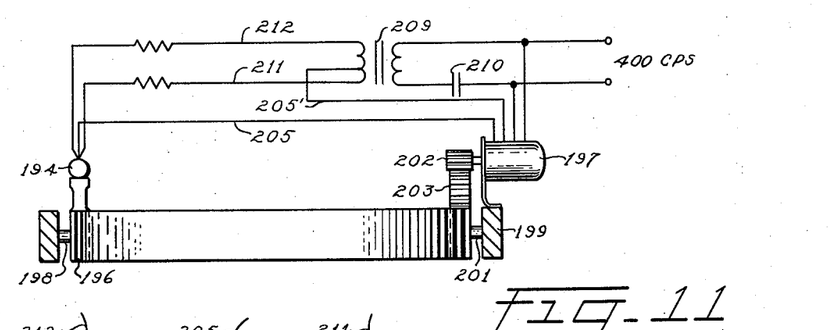
Figures 11 and 12 depict the components and circuit interconnections of the pitch stabilization circuit.
Figure 12:
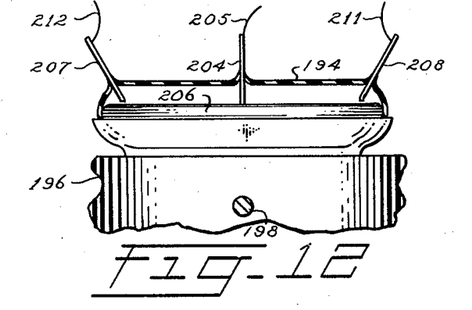

Pitch stabilization is accomplished by a simple gravity-operated device. This device consists of a mercury switch 194, Figs. 11 and 12, mounted on the pitch gimbal ring 196 which supports array 11, Fig. 1, and controls a two-phase motor 197, Fig. 11. The switch 194 is mounted directly above one gimbal ring bearing 198 and the motor is mounted on a frame ring 199 directly above the other gimbal ring bearing 201. The motor shaft carries a pinion 202 meshing with a gear sector 203 mounted on the gimbal ring 196, so that motor rotation controls the pitch angle of ring 196 relative to the frame ring 199. The mercury switch 194 has a center pin 204 making contact with the mercury 206 and two end pins 207 and 208 which just fail to touch the mercury surface when the switch is horizontal. Pin 204 is connected through conductor 205 with one wire of one phase winding of motor 197. The other wire 205' of the same phase winding is connected to the center tap of the secondary winding of a transformer 209 having its primary winding connected to power through a capacitor 210. The ends of the secondary winding are connected through conductors 211 and 212 to switch contact pins 208 and 207. When the switch is tilted one or the other of pins 207 or 208 contacts the mercury 206. This closes the circuit of one phase of motor 197, causing the motor to run either forward or backward to preserve the horizontality of gimbal ring 196 in the fore-and-aft direction. When horizontality has been attained, the mercury switch opens the circuit and the motor stops.

Memory operation

If, as the drift sight operates, the Doppler input signal grows weak, a level will be reached below which the instrument will not operate satisfactorily. A detector and relay circuit is therefore provided which at this level converts the instrument to "memory" operation. The circuit also places the instrument in this condition at commencement of operation before the Doppler signal has been acquired.

The signal-plus-noise output of band-pass 36 kc. p.s. filter 79, Fig. 2, is supplied through conductor 213 and amplifier 214 to a detector 215. The wideband signal-plus-noise is also picked up ahead of filter 79 through isolating resistor 216 and is filtered at 31 kc. p.s. by filter 217. The output of filter 217 thus contains noise with practically no signal when the signal is centered on 36 kc. p.s. filter 79, as it is during tracking. The output of filter 217 is amplified by amplifier 218 and is detected in detector 219. The outputs of detectors 215 and 219 are subtracted in subtracting circuit 220, the output representing signal from which noise has been subtracted. This quantity, actually $$\frac{S+N}{N}$$

representing signal strength above noise, is more easily derived than the signal-to-noise ($S/N$) and is commonly although incorrectly referred to as the $S/N$ signal.

The output of subtracting circuit 220 is applied to the contact arm 221 of a relay, the coil 221' of which is operated at one cycle per second from the beam switching relay 168 and in synchronism therewith. The two fixed contacts 221R and 221L of relay 221' are connected through two integrating amplifiers 222 and 223 to two relay coils 224 and 226. These integrating amplifiers have such time constants that, when a signal is applied through either one strong enough to operate relay 224 or 226, the amplifier holds the relay operated during the entire cycle of contact arm 221 operation. Thus, when the signal from the right microwave beam is above threshold strength, a signal through contact 221R holds relay 224 closed continuously and when the left beam is above threshold the 221L contact signal holds relay 226 operated continuously. The relays 224 and 226 are depicted as deenergized, with their contact arms on the corresponding back contacts 224' and 226'. All other relay contact arms are also depicted in the drawings in positions corresponding to deenergized relay coils.

When relays 224 and 226 are deenergized, as they are in the memory mode of operation and at the beginning of operation, a circuit is made from the 28-volt supply terminal 227 through contact 224', relay coil 116 and contact 226' to ground. Relay 116 therefore operates, operating its contact arms 116A, 116B and 116C to their contacts 228, 229 and 231. Relay 173 remains deenergized, with its contact arms 173A, 173B and 173C resting on their back contacts 232, 233 and 234. The azimuth amplifier input conductor 174 is therefore grounded through arm 173C, contact 234, arm 116B and contact 229. The input of integrator 119 is disconnected from the main loop signal output and is connected through relay arm 116C and contact 231 to the arm 236 of a three-position single-pole double-throw manual switch or key 237. This is the ground speed slew switch used to cause the frequency tracker to search for and acquire its input signal. One contact 238 is connected to a negative fixed direct potential source 239 and the other contact 241 is connected to the integrator output conductor 121 constituting a varying source of direct positive potential. A biasing connection 242 is taken from azimuth amplifier 163 to relay contact arm 173B, and from its back contact 233 to the contact arm 240 of a manual drift angle slewing switch or key 243. The two fixed contacts 244 and 246 of this key are connected to the opposite sides of a 26 volt, 400 c.p.s. source of potential represented by terminals 247.

The biasing connection 242 to azimuth amplifier 163 is shown in greater detail in Fig. 13. One or the other of terminals 247, Figs. 2 and 13, of a grounded center tap transformer winding 248, Fig. 13, is connected by switch 243, arm 173B, conductor 242 and resistor 245 to the grid 249 of a triode 251 having an output transformer 252 biased from a 400 c.p.s. winding 253. Either of diodes 254 or 256 conducts pulsating direct current, depending on the position of manual switch 243, causing the corresponding triode 257, or 258 to conduct. One of the magnetic amplifier control windings 259 or 261 is thereby energized, with corresponding rotation of the azimuth motor 159 in one direction or the other.

In operation in the memory mode, when no Doppler signal or when a below-threshold Doppler signal is applied all relays are in the memory position just described, only relay 116, Fig. 2, being operated. The integrator 119 has zero input potential, so that its output potential retains its level without changing. This causes oscillator 124 to emit an unchanging frequency output. If, therefore, after a fading input Doppler signal the strength should again increase to above threshold, and if its Doppler signal representing aircraft speed should be close to its value before fading, the frequency tracker will automatically acquire and lock to the Doppler signal because the oscillator frequency has remained unchanged. That is to say, the frequency tracker has "remembered" the last received Doppler frequency.

Since the azimuth servomechanism is grounded in the memory mode, the servomechanism does not operate and the antenna array remains locked at the drift angle to which it was previously set. If, therefore, after a fading input Doppler signal the strength should increase to above threshold, and if aircraft course and wind velocity should remain unchanged, the azimuth servo will automatically reacquire the Doppler signal and the drift angle will again automatically follow changes in aircraft course and wind velocity. That is, the azimuth servo has "remembered" the previous drift angle.

In reacquiring the Doppler signal after a hiatus as described, the relays are moved to their positions for the normal mode of operation. Relays 224 and 226 operate and remain closed, deenergizing relay 116 and energizing relay 173. Contact arm 116A makes contact with contact 262, lighting ground speed lamp 263 indicating that the frequency tracker is tracking the Doppler frequency. Contact arm 173A makes contact with the contact 264, lighting drift lamp 266 indicating that the azimuth servo is tracking the drift angle. Contact arm 116B is released, removing the ground from the azimuth servo input. Contact arm 173C is operated to contact 172, connecting the frequency tracker main loop output to the azimuth servo input. Contact arm 116C is released, disconnecting key 237 and connecting the frequency tracker conductor 103 to the integrator input and thus closing the frequency tracker main loop. The bias slew connection to azimuth amplifier 163 through contact arm 173B is removed and in its place a linearizing negative feedback from tachometer 161 is applied through contact 235.

*Manual signal acquisition*

Manual signal acquisition takes place in two steps, the first terminating in what is called the "half-memory" mode of operation and the second terminating in complete acquisition. Initially it is assumed that no Doppler signal is being received, no signals are applied from the S/N detector to the integrating amplifiers 222 and 223, and all relays are in the memory position as described, only relay 116 being operated.

When it is desired to find the Doppler signal and lock the drift sight to it, the manual speed slew key 237 is moved by hand from its normal center position either to contact 238 or to contact 241. Assuming movement to contact 238, negative potential from terminal 239 is applied to integrator 119, causing oscillator 124 to increase or sweep up in frequency at a constant rate. Increase of the oscillator input bias potential at conductor 123 causes the speed servomechanism to operate with increase of the indication of speed indicator 176. Assuming that initially the speed indication is higher than the actual aircraft speed, then because of this fact or for some other reason the search for the Doppler signal may be unsuccessful and the operator will note that the speed indicator reaches the top of its scale without speed lock having been effected. The operator then moves key 237 to contact 241, utilizing the positive output voltage of the integrator 119 as its positive input signal. This causes the oscillator to decrease frequency or sweep down. Moreover, the rate of sweep will decrease as the frequency decreases in such manner that a spectrum of the normal width of the Doppler spectrum is swept in the same period of time at any frequency. This means that at whatever frequency the Doppler spectrum may be, the chance of detecting it is constant.

In general the antenna array will not be pointing along the ground track and a far stronger signal will be received from the microwave beam on one side than from the other, or perhaps no signal at all will be received from one beam. Therefore, in general, when the oscillator sweeps and locks to the Doppler signal, causing a 36 kc./s. signal output from filter 79, that signal will be predominately or exclusively on either the right beam contact 221R or the left beam contact 221L. If the former, only relay 224 will be operated and if the latter only relay 226 will be operated. But in either case the result is the same: relay 116 is released and relay 173 remains deenergized.

This results in half memory operation as follows. Contact arm 116A engages its contact 262, lighting ground speed lamp 263. Contact arm 116B engages its contact 267 and contact arm 173C remains on contact 234, so that a connection from push-pull detector 84 is made through conductor 268, capacitor 269, contact arm 116B, arm 173C, and conductor 174 to the azimuth amplifier 162. Contact arm 116C is released to contact 271, thus completing the main loop and applying the phase-detected output of amplifier 96 to the integrator 119. This action also removes speed slew key 237 from the circuit. The frequency tracker thus acquires a signal from one beam and commences tracking it automatically.

The connection 268 from push-pull detector 84 is shown in detail in Fig. 3. It applies a 1 c.p.s. potential through capacitor 269 to the azimuth amplifier input conductor 174, Fig. 13, the positive half cycle coinciding with whichever beam, right or left, is responsible for the signal. This results in servoing the antenna array in azimuth in such direction as to bring the other beam into operation. When and if this occurs, the other relay of relays 224 and 226, Fig. 2, is operated, relay 173 is operated, the azimuth servo receives a normal signal and normal azimuth tracking commences, lamp 266 lighting and all relays taking their normal positions as previously described. If the signal from the second beam fails to appear, the azimuth servo is manually slewed as follows, the relays being in their half-memory positions as described and contact arm 173B remaining on contact 233. Manual slew key 243, Figs. 2 and 13, is moved to either contact, applying 400 c.p.s. biasing potential to the amplifier. This causes motor 159 to rotate, slewing the antenna array and moving drift indicator 158 in either one or the other direction. If the drift indicator reaches its maximum reading without the signal being acquired, the drift slew key 243 is moved to its other contact, reversing the directions of rotation of the antenna array 11 and of the drift indicator 158.

When the second beam produces an above-threshold signal, the other of the two relays 224 and 226 operates, changing the circuit to the normal mode. The azimuth servo thereafter tracks the right and left beam signals, maintaining the arrays pointing along the ground track and causing the drift indication to become accurate. This is signalled by lighting of the drift lamp 166, and all relays take their normal mode positions.

What is claimed is:

1. An aircraft microwave Doppler drift sight comprising, an antenna-transmitter-receiver emitting a Doppler signal containing ground speed and drift information, an automatic frequency tracker actuated by said Doppler signal, a ground speed indicator actuated by said frequency tracker, manual means for causing said frequency tracker initially to acquire said Doppler signal, automatic antenna rotating means actuated by drift information from said frequency tracker, a drift indicator attached to said antenna rotating means and manual means for causing said antenna rotating means initially to acquire said drift information.

2. A microwave aircraft drift sight comprising, means on said aircraft including a microwave antenna for projecting at least a pair of microwave signal beams toward the earth's surface and for receiving the reflected echo signals thereof, means including a frequency tracker for deriving a pair of signals containing Doppler difference frequencies from said reflected echo signals, the average signal of said pair of signals being representative of aircraft ground track speed, means operated in accordance with said average signal for displaying an indication of ground track speed, means including an antenna rotator actuated in accordance with the output of said frequency tracker for deriving the drift angle therefrom, manual slewing means for changing the frequency of said frequency tracker to said average signal frequency whereby the frequency tracker is locked to its input signal, and manual slewing means for equalizing said pair of signals whereby said antenna rotator is locked to the ground track direction.

3. A microwave aircraft drift sight comprising, a microwave generator, a microwave beam antenna, means for directing at least two beams from said antenna toward the earth on either side of the ground track thereof, means for receiving earth reflection radiation echoes of said beams, means for converting said echoes into electrical signals containing Doppler frequency difference information representative of the ground track speed of said aircraft, servo means including said last-named means for automatically aligning two of said beams at equal azimuth angles on opposite sides of said ground track, means connected to said aligning means for indicating the drift angle, an automatic frequency tracker operated by said Doppler frequency difference, means connected to said automatic frequency tracker for indicating the ground track speed, first manual means in said frequency tracker for initially adjusting the frequency tracker to the frequency representing said ground track speed, and second manual means in said servo means for initially aligning said two beams at equal azimuth angles on opposite sides of said ground track.

4. An aircraft microwave Doppler drift sight comprising, an antenna-transmitter-receiver emitting a Doppler signal containing ground speed and drift information, a Doppler frequency tracker including an oscillator, means causing said oscillator to produce an output signal which is alternately one frequency and another frequency, modulator means receiving said Doppler signal and the output of said oscillator to produce at least one side-band heterodyne signal whose frequency successively alternates between two selected values, a band-pass filter having a center frequency intermediate those of said two selected frequency values, a detector having the outputs of said filter impressed thereon, phase detector means for determining the senses of said detector outputs relative to the center frequency of said band-pass filter, an integrator having the output of said phase detector means impressed thereon, and means controlling the mean frequency of said oscillator in accordance with the mean of said integrator outputs.

5. An aircraft microwave Doppler drift sight comprising, an antenna-transmitter-receiver emitting a Doppler signal containing ground speed and drift information, amplifier automatic gain control means in said antenna-transmitter-receiver increasing gain suppression for Doppler signals above a selected intensity level, a Doppler frequency tracker having a main loop developing an error signal, an integrating amplifier in said main loop having an input receiving said error signal, means applying said Doppler signal to said Doppler frequency tracker, means connected to said main loop deriving and displaying an indication of ground speed, a push-pull detector in said main loop having a first output composed of a two-frequency signal and having a second output containing the lower frequency of said two-frequency signal, a phase detector in said main loop detecting the phase of the higher frequency of said two-frequency signal and developing an intermittent direct current having a polarity representing said phase, said direct current constituting said error signal, means responsive to the reduction of said Doppler signals below a selected intensity for removing said error signal from the input of said integrating amplifier and connecting a speed slewing key circuit thereto, whereby manual acquisition by said frequency tracker of the ground speed information may be effected, an azimuth servomechanism connected for operation from said frequency tracker and containing an electromechanical relay phase detector for the lower of said two frequencies, means actuated by said means responsive to reduced Doppler signals disconnecting said azimuth servomechanism from said frequency tracker and connecting the azimuth servomechanism to a drift slew key circuit whereby manual acquisition by said azimuth servomechanism of the drift information may be effected, and means connected to said azimuth servomechanism displaying an indication of drift angle.

6. An aircraft microwave Doppler drift sight comprising, an antenna-transmitter-receiver emitting a Doppler signal containing ground speed and drift information, said antenna-transmitter-receiver emitting right and left microwave beams in alternation, a frequency tracker actuated by said Doppler signal, a signal-to-noise ratio detector emitting a normal signal when the Doppler signals representing both right and left beams are above threshold intensity, emitting a memory signal when neither Doppler signal is above threshold intensity, and emitting a half-memory signal when either one of the Doppler signals is above threshold intensity, an antenna rotator actuated from said frequency tracker, a speed slew key circuit, a drift slew key circuit, means operated by said memory signal connecting said speed slew key circuit to said frequency tracker and connecting said drift slew key circuit to said antenna rotator, means operated by either said half memory signal or said normal signal disconnecting said speed slew key circuit, means operated by said normal signal disconnecting said drift slew key circuit, speed indicating means actuated by said frequency tracker, and drift indicating means actuated by said antenna rotator.

7. An aircraft microwave Doppler drift sight comprising, an antenna-transmitter-receiver emitting a Doppler signal containing ground speed and drift information, a frequency tracker main loop including a modulator receiving said Doppler signal, a frequency-modulated oscillator connected to said modulator adjusted to heterodyne said Doppler signal to two constant frequencies, a filter tuned to a selected frequency higher than the frequency of said Doppler signal, said filter receiving said heterodyned Doppler signal having two frequencies, the output consisting of energy at the filter frequency alternating in amplitude at the frequency modulation rate, a detector energized thereby, a phase detector converting the output of said detector to intermittent direct current having a polarity representing the greater of said alternating amplitudes, an integrating amplifier excited by said intermittent direct current and emitting a direct potential, a proportioning circuit adding to said direct potential an alternating potential of proportional magnitude having said frequency modulation rate, means applying said added direct and alternating potentials to bias said frequency-modulated oscillator, and manual means for changing the bias of said frequency-modulated oscillator to cause said main loop to acquire said Doppler signal.

8. A frequency tracker for measuring and tracking the frequency of a changeable frequency input signal comprising a modulator, means for impressing said input signal on said modulator, means for impressing upon said modulator an alternating voltage whose frequency is alternately one or the other of two selected values, and means responsive to the output of said modulator for adjusting the frequencies of said alternating voltage so that their mean frequency differs by a selected amount from said input signal frequency.

9. A frequency tracker comprising an input circuit applying a changeable frequency signal to a modulator, means for impressing upon said modulator an alternating voltage whose frequency is alternately one or the other of two selected values, a band-pass filter having a selected center transmission frequency, said filter being connected to the output of said modulator, and means responsive to the output of said filter for controlling the frequencies of said alternating voltage.

10. A frequency tracker comprising an input circuit applying a changeable frequency signal to a modulator, means for impressing upon said modulator an alternating voltage whose frequency is alternately one or the other of two selected values, a band-pass filter having a selected center transmission frequency, said filter being connected to the output of said modulator, and means responsive to the output of said filter for adjusting the frequencies of said alternating voltage so that the difference between their mean frequency and the frequency of said changeable frequency signal equals said selected center transmission frequency.

11. A frequency tracker in accordance with claim 10 in which the two frequencies of said alternating voltage differ in frequency by an amount which added to the input signal spectrum width is not greater than the extreme transmission band of said filter.

12. A frequency tracker comprising an input circuit applying a changeable frequency signal to a modulator, means for impressing upon said modulator an alternating voltage whose frequency is alternated at a selected rate between two selected values, a band-pass filter having a selected center transmission frequency connected to the output of said modulator, demodulating means for recovering the selected rate envelope of the output of said band-pass filter, and means responsive to the output of said demodulating means for controlling the frequencies of said alternating voltage.

13. A frequency tracker comprising, an input circuit applying a changeable frequency signal to a modulator, means for impressing upon said modulator an alternating voltage whose frequency is alternated at a selected rate between two selected values, a band-pass filter having a selected center transmission frequency connected to the output of said modulator, demodulating means for recovering the selected rate envelope of the output of said band-pass filter, and means responsive to the output of said demodulating means for adjusting the frequencies of said alternating voltage so that the difference between their mean frequency and the frequency of said changeable frequency signal equals said selected center transmission frequency.

14. A frequency tracker for measuring the frequency of an input signal comprising, a modulator, means for impressing the input signal upon said modulator, means for impressing upon said modulator an alternating voltage whose frequency is alternated at a selected rate between two selected values, a band-pass filter having a selected center transmission frequency connected to the output of said modulator, demodulating means for rectifying the output of said band-pass filter, a phase detector operating at said selected rate and connected to the output of said demodulating means to secure an output having a polarity depending upon the phase of the output of the demodulating means, and means responsive to the output of said phase detector for adjusting the frequencies of said alternating voltage so that the difference between their mean frequency and the frequency of said input signal equals the selected center transmission frequency of said band-pass filter.

15. A frequency tracker for measuring the frequency of an input signal comprising, a modulator, means for impressing the input signal upon said modulator, means for impressing upon said modulator an alternating voltage whose frequency is alternated at a selected rate between two selected values, a band-pass filter having a selected center transmission frequency connected to the output of said modulator, demodulating means for rectifying the output of said band-pass filter, a phase detector operating at said selected rate and connected to the output of said demodulating means to secure an output having a polarity depending upon the phase of the output of the demodulating means, an integrating circuit connected to the output of said phase detector for securing a voltage proportional to the time integral of the voltage output of said phase detector, and means responsive to the output of said integrator for adjusting the mean frequency of said alternating voltage so that the difference between the mean frequency and that of said input signal equals the selected center frequency of said band-pass filter.

16. A frequency tracker for following and measuring an input signal consisting of a band of frequencies comprising, a modulator, means impressing said input signal on said modulator, a low frequency timing rate generator, oscillator means impressing on said modulator an alternating voltage whose frequency is alternated between two selected values at said timing rate, a band-pass filter having a selected center transmission frequency connected to the output of said modulator, a demodulator rectifying the output of said band-pass filter, a phase detector timed by said timing rate generator and connected to the output of said demodulator to secure a unilateral current having a polarity and amplitude dependent upon the phase and amplitude of the output of the demodulator, an integrating amplifier connected to the output of said phase detector and emitting a continuous direct voltage proportional to the time integral of the voltage output of said phase detector, a proportioning circuit amplitude-modulating said continuous direct voltage to an amount depending on the magnitude thereof, said modulation being at said timing rate, and circuit means applying said proportioning circuit output to said oscillator means to control the frequencies of said alternating voltage output thereof.

References Cited in the file of this patent

UNITED STATES PATENTS

| | | |
|---|---|---|
| 1,864,638 | Chilowsky | June 28, 1932 |